(12) United States Patent
Shim et al.

(10) Patent No.: US 12,367,795 B2
(45) Date of Patent: Jul. 22, 2025

(54) IMAGE DISPLAY DEVICE

(71) Applicants: HYUNDAI MOTOR COMPANY, Seoul (KR); KIA CORPORATION, Seoul (KR); SL CORPORATION, Daegu (KR)

(72) Inventors: Joon Bo Shim, Hanam-si (KR); Yong Duk Bae, Gyeongsan-si (KR); Cheol Chun Yang, Gyeongsan-si (KR); Ji Hun Park, Suwon-si (KR); Hee Beom Park, Hwaseong-si (KR); Jung Hee Seo, Gyeongsan-si (KR); Gyun Chae, Yongin-si (KR)

(73) Assignees: HYUNDAI MOTOR COMPANY, Seoul (KR); KIA CORPORATION, Seoul (KR); SL CORPORATION, Daegu (KR)

( * ) Notice: Subject to any disclaimer, the term of this patent is extended or adjusted under 35 U.S.C. 154(b) by 0 days.

(21) Appl. No.: 18/516,415

(22) Filed: Nov. 21, 2023

(65) Prior Publication Data
US 2025/0029521 A1    Jan. 23, 2025

(30) Foreign Application Priority Data
Jul. 20, 2023    (KR) .................. 10-2023-0094721

(51) Int. Cl.
*G09G 3/00*     (2006.01)
*G09F 11/02*    (2006.01)
(Continued)

(52) U.S. Cl.
CPC .............. *G09G 3/001* (2013.01); *H02J 50/10* (2016.02); *F21V 21/15* (2013.01); *F21V 21/30* (2013.01);
(Continued)

(58) Field of Classification Search
CPC .............. G09G 3/001; G09G 2330/02; G09G 2370/16; G09G 2380/10; G09G 3/005;
(Continued)

(56) References Cited

U.S. PATENT DOCUMENTS

2008/0024330 A1* 1/2008 Rehmann ........... G01D 5/24476
341/50
2022/0343812 A1* 10/2022 Woo ....................... G09F 11/10
(Continued)

FOREIGN PATENT DOCUMENTS

KR         100374154 B1     2/2003

*Primary Examiner* — Douglas Wilson
(74) *Attorney, Agent, or Firm* — Lempia Summerfield Katz LLC

(57) ABSTRACT

An image display device is disclosed in which electrical connection to a rotary body is reliably maintained during rotation of the rotary body and supply of power and transmission and reception of a signal are stabilized. Since transmission and reception of a signal between a communication transmitter and a communication receiver are implemented through a cavity formed in a motor, introduction of an external signal is blocked, and thus security and control stability are ensured. Even when a rotary module rotates at a high speed, damage thereto due to friction is prevented, and thus the durability thereof is ensured. Rotation of the rotary module is stabilized through structural stabilization.

13 Claims, 5 Drawing Sheets

(51) Int. Cl.
- *G09F 11/04* (2006.01)
- *G09F 11/10* (2006.01)
- *G09F 19/02* (2006.01)
- *H02J 50/10* (2016.01)
- *F21V 21/15* (2006.01)
- *F21V 21/30* (2006.01)
- *F21V 33/00* (2006.01)
- *G09F 11/34* (2006.01)
- *G09F 13/22* (2006.01)
- *G09F 19/12* (2006.01)

(52) U.S. Cl.
CPC .......... *F21V 33/0052* (2013.01); *G09F 11/02* (2013.01); *G09F 11/025* (2013.01); *G09F 11/04* (2013.01); *G09F 11/10* (2013.01); *G09F 11/34* (2013.01); *G09F 2013/222* (2013.01); *G09F 19/02* (2013.01); *G09F 19/12* (2013.01); *G09G 3/005* (2013.01); *G09G 2330/02* (2013.01); *G09G 2370/16* (2013.01); *G09G 2380/10* (2013.01)

(58) Field of Classification Search
CPC ........ H02J 50/10; G09F 11/02; G09F 11/025; G09F 11/04; G09F 11/10; G09F 11/34; G09F 19/02; G09F 2013/222; G09F 19/12; F21V 21/15; F21V 21/30; F21V 33/0052

See application file for complete search history.

(56) References Cited

U.S. PATENT DOCUMENTS

2022/0377916 A1\* 11/2022 Park .................. G09F 11/02
2022/0406229 A1\* 12/2022 Lee ................... G09F 13/22

\* cited by examiner

IMAGE DISPLAY DEVICE

CROSS-REFERENCE TO RELATED APPLICATION

This application claims priority to and the benefit of Korean Patent Application No. 10-2023-0094721, filed on Jul. 20, 2023 in the Korean Intellectual Property Office, the entire disclosure of which is incorporated herein by reference.

BACKGROUND OF THE DISCLOSURE

1. Technical Field

The present disclosure relates to an image display device, and more particularly, to an image display device in which electrical connection to a rotary body is reliably maintained during rotation of the rotary body and supply of power and transmission and reception of a signal are stabilized.

2. Description of the Related Art

Various technologies for supplying power and transmitting and receiving an electrical signal to and from a continuously rotating device are applied to mechanical devices or electronic devices.

For example, many devices requiring electrical connection are used in structures performing rotary motion, such as rotary lighting devices, LiDAR, antennas, and robots. Wires are connected to rotary bodies in order to supply power thereto and to transmit and receive signals thereto and therefrom.

However, there may occur a problem that rotary bodies are not capable of rotating due to twisting of wires in a rotating direction.

In order to solve this problem, a conductor-contact-type electrical connection structure may be applied to a rotary body and a fixed body. However, it is difficult to realize high-speed rotation and to ensure durability due to continuous friction between contact portions.

In particular, in the case of a device in which a rotary body needs to rotate at a high speed, it is difficult to maintain electrical connection using a conductor contact structure, abnormal noise is generated, and durability deteriorates due to friction over usage time. A mercury slip ring may be used in order to realize high-speed rotation. In this case, however, use of the mercury slip ring may be limited by regulations on heavy metal contamination.

The information disclosed in this Background of the Disclosure section is only for enhancement of understanding of the general background of the disclosure, and should not be taken as an acknowledgement or any form of suggestion that this information forms the related art already known to a person having ordinary skill in the art.

SUMMARY

Therefore, the present disclosure has been made in view of the above problems, and it is an object of the present disclosure to provide an image display device in which electrical connection to a rotary body is reliably maintained during rotation of the rotary body and supply of power and transmission and reception of a signal are stabilized.

In accordance with the present disclosure, the above and other objects can be accomplished by the provision of an image display device including a fixed module, which is fixed to a base and includes a main controller, a motor, a communication transmitter, and a power transmitter. The image display device also includes a rotary module, which is rotatably connected to the motor and includes an optical module provided with a plurality of light sources. The rotary module further includes a communication receiver and a power receiver configured to receive a command and power from the main controller to form an illumination image by turning the plurality of light sources on or off.

The image display device may further include a lens cover fixed to the base to cover the fixed module and the rotary module.

The fixed module may further include a fixed plate, where the motor, the communication transmitter, and the power transmitter may be mounted on the fixed plate. The rotary module may further include a rotary plate connected to the fixed plate via the motor, where the optical module, the communication receiver, and the power receiver may be mounted on the rotary plate.

The image display device may further include a shaft coupled to the center portion of the rotary plate. The lens cover may include a rotation support portion formed to allow the shaft to be rotatably coupled thereto.

The optical module may include a light source unit in which the plurality of light sources is arranged and a sub-controller configured to transmit a command and power of the main controller to the light source unit.

The light source unit may be provided in plural (i.e., may include a plurality of light source units), and the plurality of light source units may be disposed around the rotary plate so as to be spaced apart from each other. The plurality of light sources may be arranged in a direction perpendicular to the rotary plate.

The rotary plate and the sub-controller may be formed in a circular shape.

The motor may include a stator and a rotor. The stator may be mounted to the center portion of the fixed plate, and the rotor may be connected to the center portion of the rotary plate.

Each of the fixed plate and the rotary plate may include a communication through-hole formed in the center thereof, and each of the stator and the rotor of the motor may have a hollow shape having a cavity formed therein. The communication transmitter and the communication receiver may transmit and receive a signal therebetween through the communication through-hole formed in each of the fixed plate and the rotary plate and the cavity formed in each of the stator and the rotor.

Each of the power transmitter and the power receiver may be implemented as a coil having a cavity formed in the center thereof, and the motor may be disposed at the center of the cavity.

The fixed plate may be provided with a fixed cover configured to accommodate the power transmitter and to be open toward the power receiver. The rotary plate may be provided with a rotary cover configured to accommodate the power receiver and to be open toward the power transmitter.

The fixed cover and the rotary cover may extend so as to face each other, and may be spaced a predetermined gap from each other.

The image display device may further include a position sensor included in the fixed module and the rotary module to detect a rotational position of the rotary module.

The position sensor may include a detection transmitter and a detection receiver, and the detection transmitter and the detection receiver may be mounted on the fixed plate and the rotary plate, respectively, and may be disposed so as to face each other.

The detection transmitter may be provided in plural (i.e., may include a plurality of detection transmitters), and the plurality of detection transmitters may be disposed on the fixed plate so as to be spaced apart from each other at regular intervals. The detection receiver may be provided in plural (i.e., may include a plurality of detection receivers), and the plurality of detection receivers may be disposed on the rotary plate so as to be spaced apart from each other at regular intervals.

Each of the fixed plate and the rotary plate may include a detection through-hole formed in a peripheral portion thereof, and the detection transmitter and the detection receiver may be mounted on the fixed plate and the rotary plate, respectively, so as to transmit and receive a signal therebetween through the detection through-hole.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION

Figure 1:
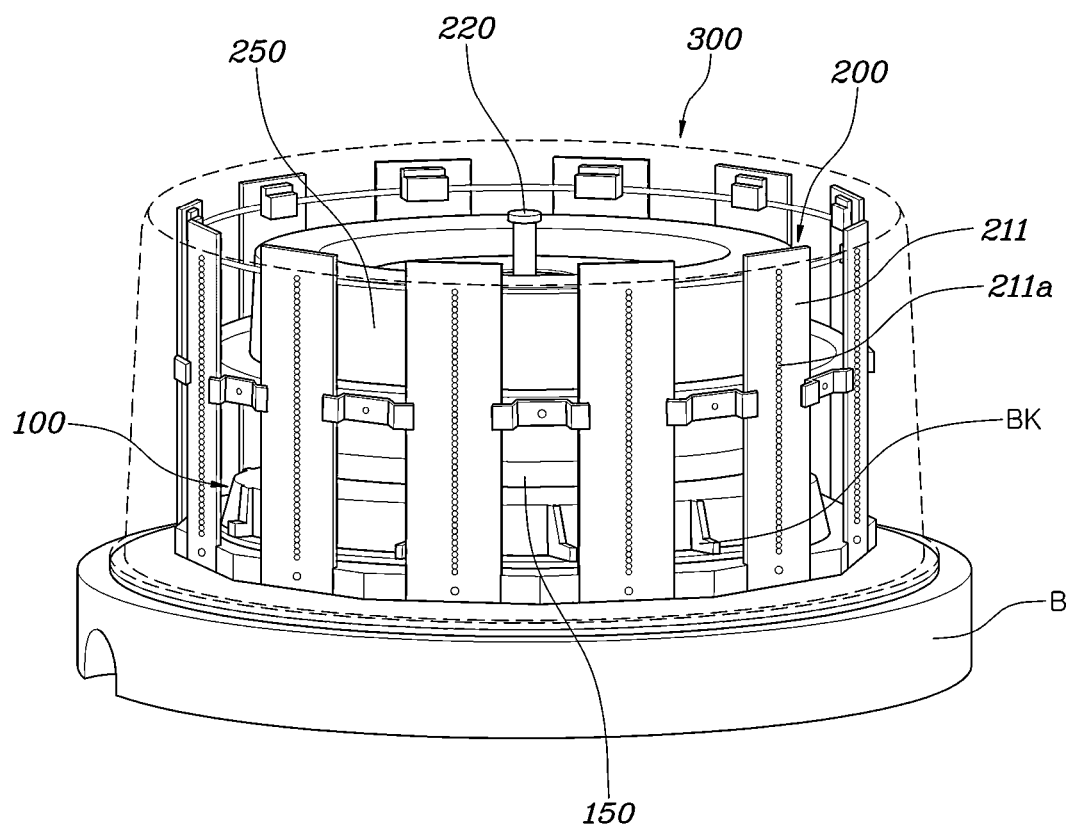
FIG. 1 is a view showing an image display device according to an embodiment of the present disclosure.

Hereinafter, the embodiments disclosed in the present specification are described in detail with reference to the accompanying drawings, and the same or similar elements are denoted by the same reference numerals even though they are depicted in different drawings, and redundant descriptions thereof are omitted.

In the following description, respect to constituent elements used in the following description, the suffixes "module" and "unit" are used only in consideration of facilitation of description, and do not have mutually distinguished meanings or functions.

In the following description of the embodiments disclosed in the present specification, a detailed description of known functions and configurations incorporated herein are omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It is understood that although the terms "first", "second", etc., may be used herein to describe various components, these components should not be limited by these terms. These terms are only used to distinguish one component from another component.

It is understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

It is further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

When a component, device, element, or the like of the present disclosure is described as having a purpose or performing an operation, function, or the like, the component, device, or element should be considered herein as being "configured to" meet that purpose or to perform that operation or function.

Hereinafter, an image display device according to an embodiment of the present disclosure is described with reference to the accompanying drawings.

As shown in FIGS. 1-5, an image display device according to the present disclosure includes a fixed module 100, which is fixed to a base B and includes a main controller 110, a motor 120, a communication transmitter 130, and a power transmitter 140. The image display device also includes a rotary module 200, which is rotatably connected to the motor 120 and includes an optical module 210 provided with a plurality of light sources 211*a*, and further includes a communication receiver 230 and a power receiver 240 configured to receive a command and power from the main controller 110 to form an illumination image by turning the respective light sources 211*a* on or off.

The present disclosure may be applied to various objects, such as mobility vehicles and structures. For example, the present disclosure may be mounted on a roof of a mobility vehicle to display a message through an illumination image. In this case, the roof of the mobility vehicle may serve as the base B.

According to the present disclosure, the fixed module 100 is fixed to the base B, and the rotary module 200 forms an illumination image through the optical module 210 while rotating in a state of being supported by the fixed module 100. In particular, since the rotary module 200 receives a command signal and power in a wireless manner, the number of parts thereof causing friction with the fixed module 100 may be minimized, with a result that high-speed rotation thereof may be stabilized, reception of the command signal and power may be stably maintained, and consequently, a light image may be stably generated.

As described above, the fixed module 100 includes the main controller 110, the motor 120, the communication transmitter 130, and the power transmitter 140, and the rotary module 200 includes the optical module 210, the communication receiver 230, and the power receiver 240.

The main controller 110 transmits a command signal for formation of an illumination image required by a user or a mobility vehicle. In order to control the function thereto, the main controller 110 may include a communication device, which communicates with other controllers or sensors, a memory, which stores therein an operating system, logic commands, and input/output information, and one or more processors, which perform determinations, calculations, and decisions necessary for control of the function thereto.

In addition, the main controller 110 is provided with an inverter to convert direct current transmitted from mobility vehicle into alternating current. The alternating current converted by the main controller 110 is transmitted to the power transmitter 140. The alternating current applied to the power transmitter 140 generates a magnetic field, and induced electromotive force is generated toward the power receiver 240 included in the rotary module 200 through change in the magnetic field. The alternating current generated in the power receiver 240 is transmitted to the optical module 210 to turn on or off the light sources 211a included in the optical module 210.

The optical module 210 may include a light source unit 211 in which the plurality of light sources 211a is arranged and a sub-controller 212 configured to transmit a command and power of the main controller 110 to the light source unit 211. In other words, the light source unit 211 is electrically connected to the sub-controller 212, and the sub-controller 212 is provided with a converter to convert the alternating current transmitted through the power receiver 240 into DC power and to supply the DC power to the respective light sources 211a of the light source unit 211.

In this way, the power transmitted through the main controller 110 and the power transmitter 140 is input to the optical module 210 included in the rotary module 200 through the power receiver 240 and the sub-controller 212, thereby turning the respective light sources 211a on or off.

In addition, since the rotary module 200 is rotated by the motor 120 included in the fixed module 100, the rotary module 200 may form an illumination image using an afterimage effect by turning the respective light sources 211a of the optical module 210 on or off.

The command signal transmitted from the communication transmitter 130 included in the fixed module 100 is input to the communication receiver 230 included in the rotary module 200, and the respective light sources 211a of the optical module 210 are turned on or off in response to the command signal.

As described above, according to the present disclosure, the rotary module 200 is rotated in a state of being supported by the fixed module 100, and the respective light sources 211a of the optical module 210 included in the rotary module 200 are turned on or off to form an illumination image. Since the rotary module 200 is physically connected to the fixed module 100 via the motor 120, and since transmission and reception of a command signal and power are implemented in a wireless manner, high-speed rotation of the rotary module 200 is possible, and the durability of the device is improved.

The above-described present disclosure is described below in more detail. The fixed module 100 may further include a fixed plate 150, and the motor 120, the communication transmitter 130, and the power transmitter 140 may be mounted on the fixed plate 150.

The rotary module 200 may further include a rotary plate 250 connected to the fixed plate 150 via the motor 120, and the optical module 210, the communication receiver 230, and the power receiver 240 may be mounted on the rotary plate 250.

Figure 2:
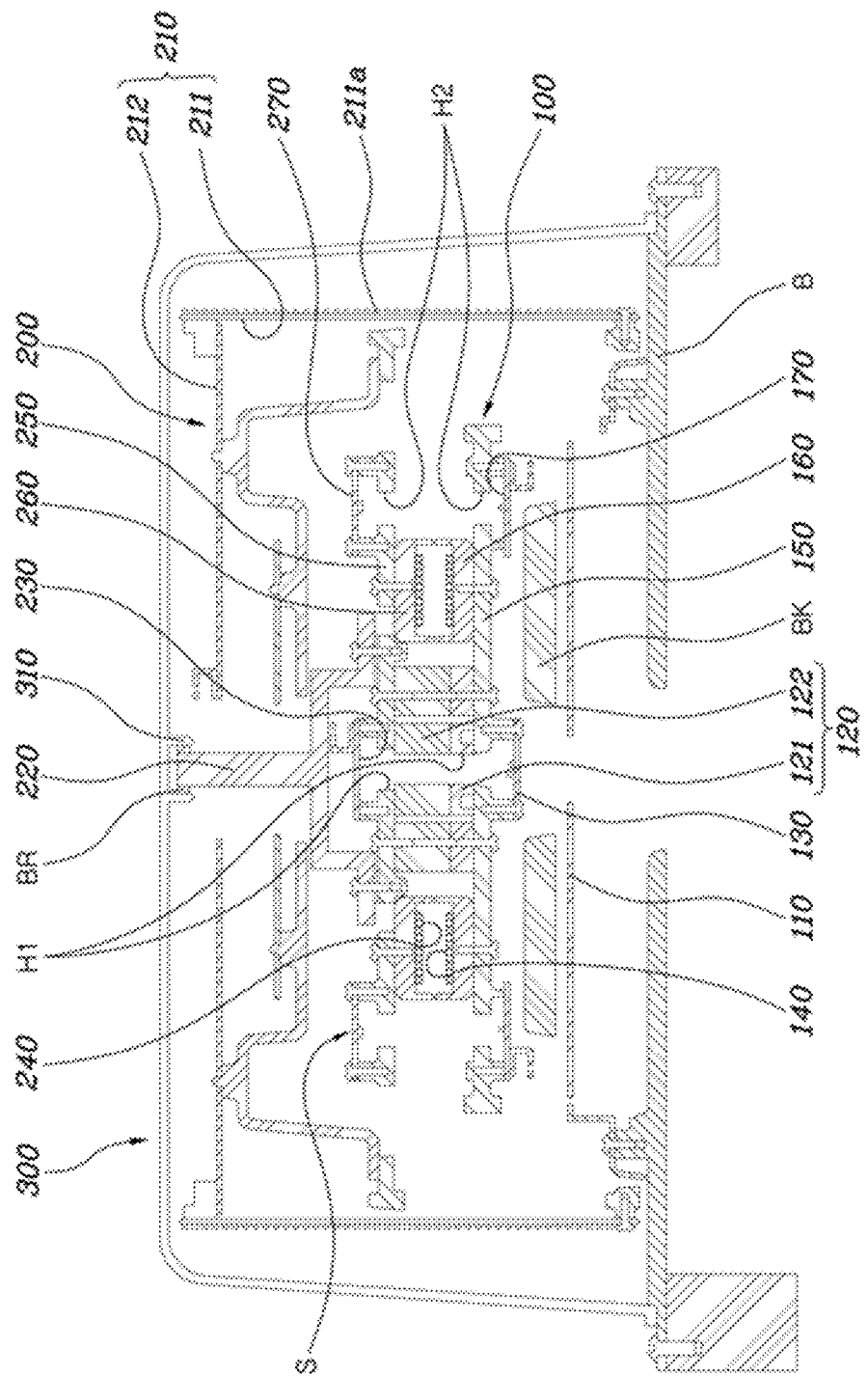
FIG. 2 is a cross-sectional view of the image display device shown in FIG. 1.
Figure 3:
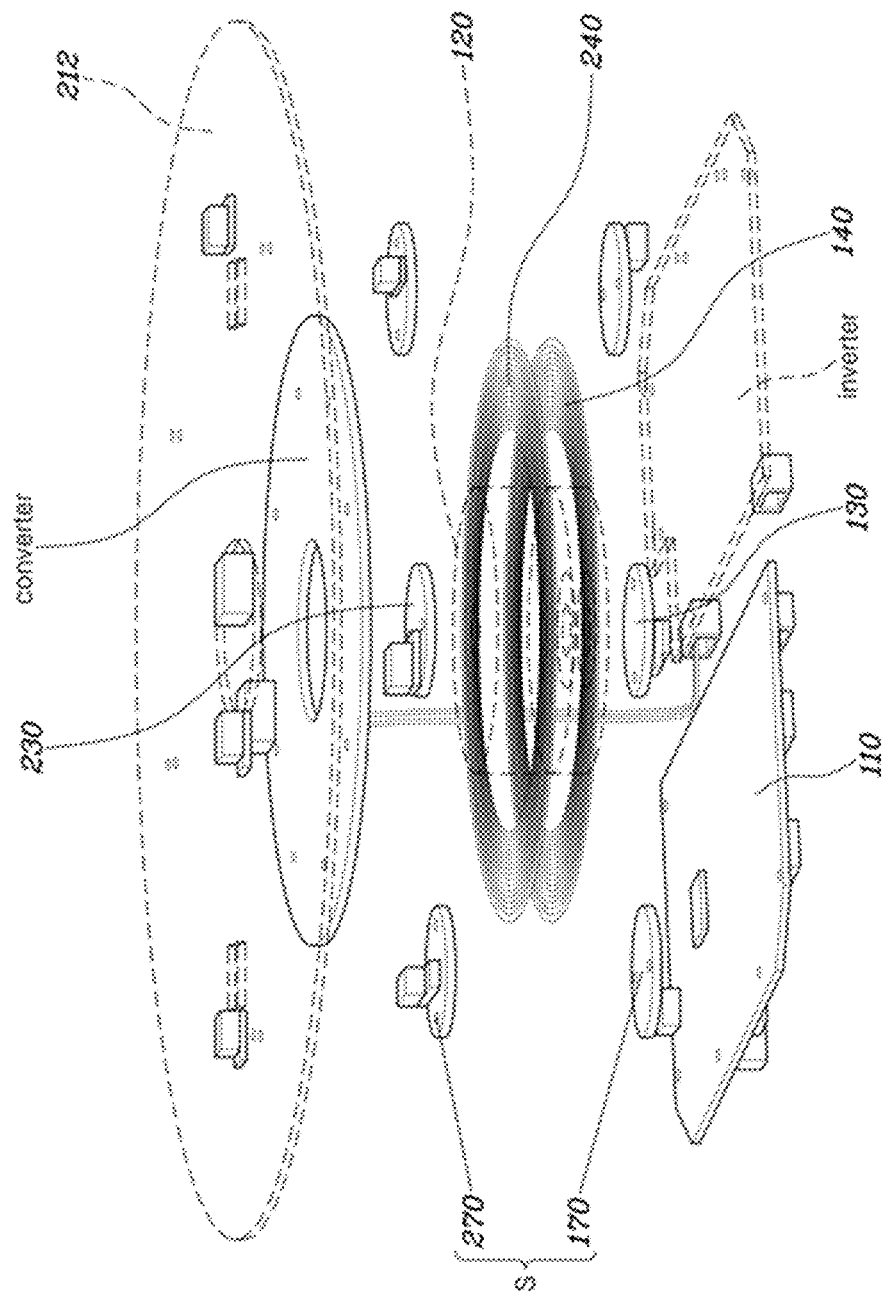
FIG. 3 is a view showing the internal configuration of the image display device shown in FIG. 1.
Figure 4:
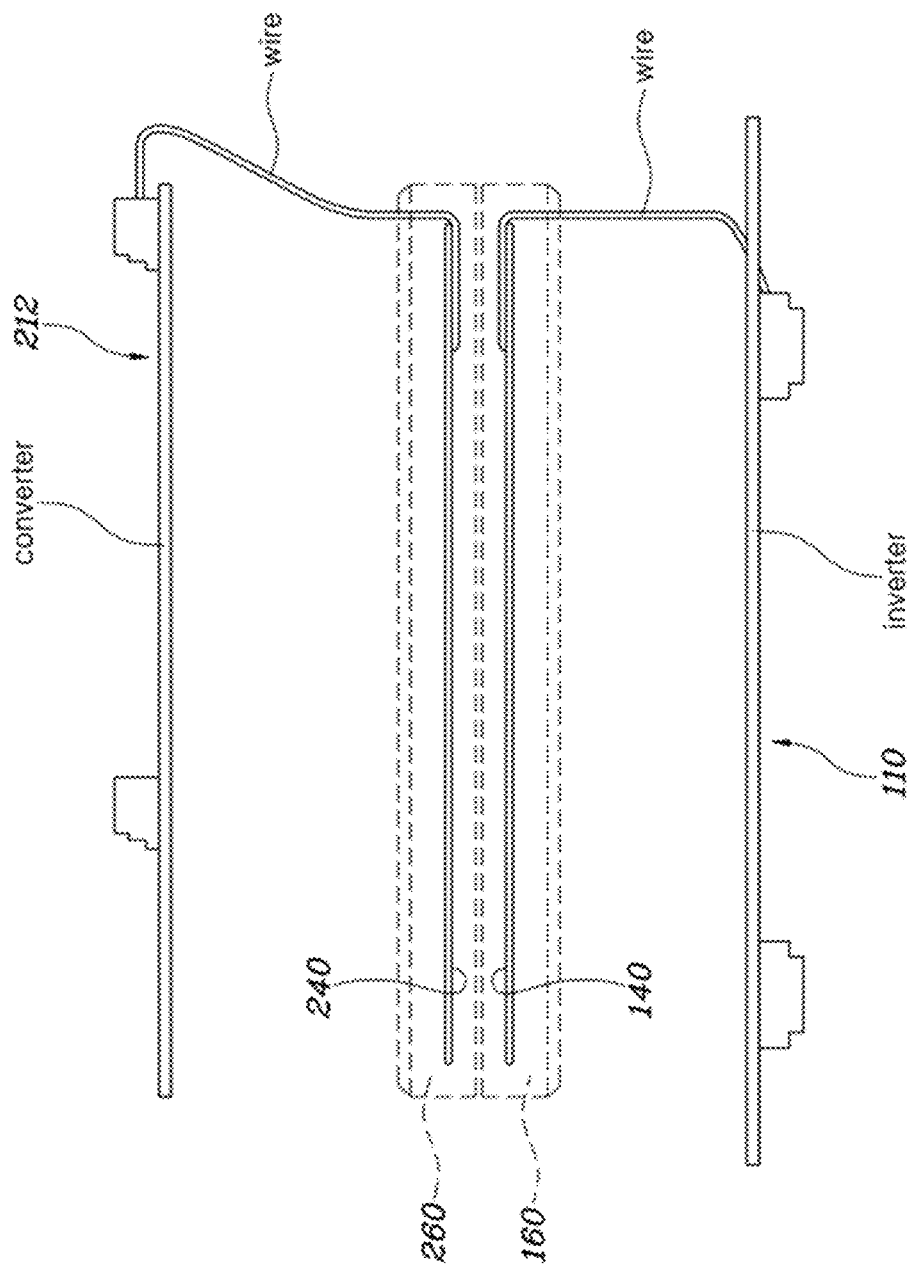
FIG. 4 is a view showing a connection structure of a power transmitter and a power receiver in the image display device shown in FIG. 1.
Figure 5:
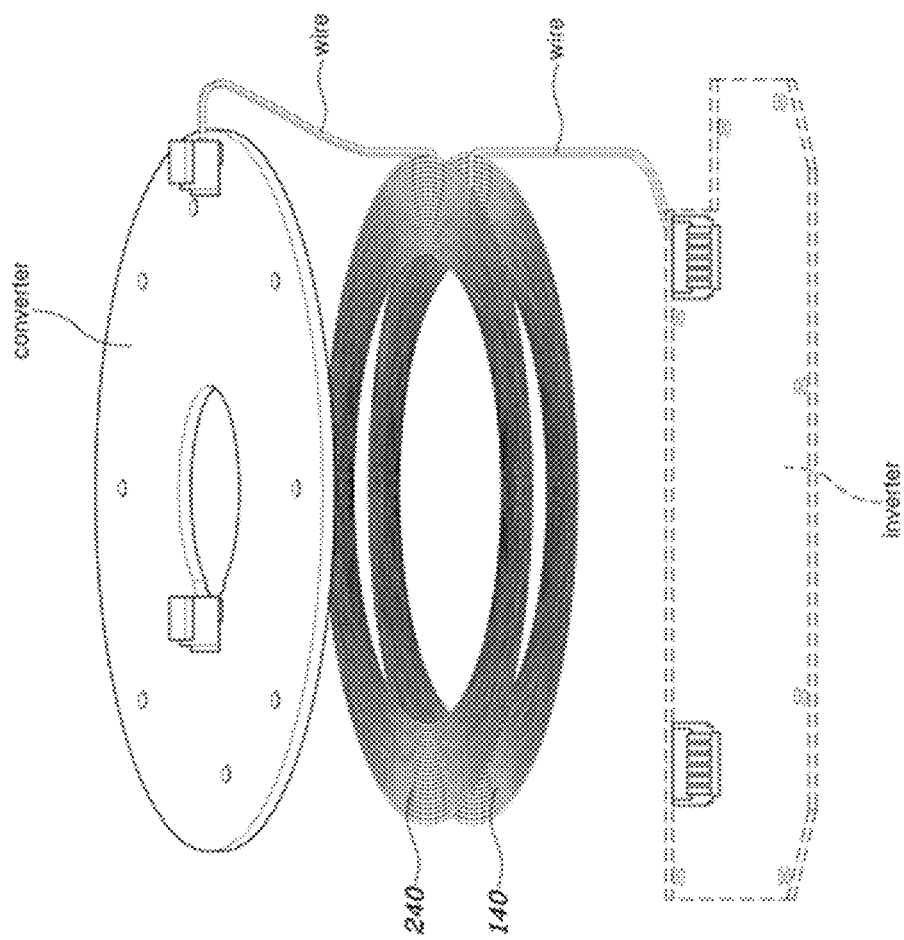
FIG. 5 is a view showing the connection structure of the power transmitter and the power receiver in the image display device shown in FIG. 1.

As shown in FIG. 2, the fixed plate 150 included in the fixed module 100 is fixed to the base B. The fixed plate 150 may be mounted to the base B via a bracket BK, whereby a fixed state thereof may be stabilized.

The rotary plate 250 included in the rotary module 200 is connected to the fixed plate 150 via the motor 120.

The fixed plate 150 and the rotary plate 250 may be formed in a plate shape, and may be disposed so as to face each other. Accordingly, the communication transmitter 130 and the power transmitter 140 mounted on the fixed plate 150 and the communication receiver 230 and the power receiver 240 mounted on the rotary plate 250 face each other, thereby transmitting and receiving and signals commands therebetween.

In addition, a lens cover 300, which is formed to cover the fixed module 100 and the rotary module 200, may be fixed to the base B.

The lens cover 300 is made of a transparent material so that light emitted from the light sources 211a included in the optical module 210 of the rotary module 200 is projected to the outside. In addition, when coupled to the base B to cover the fixed module 100 and the rotary module 200, the lens cover 300 seals a space defined thereby. Therefore, the fixed module 100 and the rotary module 200 disposed in the space defined by the lens cover 300 may be protected from external contamination and impact.

A shaft 220 may be coupled to the center portion of the rotary plate 250, and the lens cover 300 may include a rotation support portion 310, to which the shaft 220 is rotatably coupled.

Since the shaft 220 is coupled to the center portion of the rotary plate 250, the rotation axis of the rotary plate 250 and the rotation axis of the shaft 220 are aligned with each other. Since the shaft 220 is inserted into and rotatably connected to the rotation support portion 310 formed on the lens cover 300, rotation of the rotary plate 250 may be stabilized. The rotation support portion 310 may be provided with a bearing BR.

In this way, the motor 120 is coupled to one side of the center portion of the rotary plate 250, and the rotary plate 250 is rotatably connected to the lens cover 300 via the shaft 220 coupled to the opposite side of the center portion thereof. Accordingly, even when the rotary plate 250 rotates at a high speed, the rotation axis thereof may be stably maintained, and thus rotation thereof may be stabilized.

The light source unit 211 may be provided in plural as a plurality of light source units 211, and the plurality of light source units 211 may be disposed around the rotary plate 250 so as to be spaced apart from each other. The plurality of light sources 211a may be arranged in a direction perpendicular to the rotary plate 250.

Since the optical module 210 includes a plurality of light source units 211 and the plurality of light source units 211 is disposed around the rotary plate 250 so as to be spaced apart from each other at regular intervals, an illumination image may be formed by turning the plurality of light sources 211a included in each of the light source units 211 on or off. In particular, when the light sources 211a included in the light source units 211 are turned on or off in the state in which the rotary module 200 is rotating, if the light source units 211 disposed at regular intervals are alternately turned on or off, the quality of an illumination image may be improved, and thus the visibility of the illumination image may be improved.

In addition, since the plurality of light sources 211a included in the light source units 211 is arranged in a direction perpendicular to the rotary plate 250, an illumination image may have a size corresponding to a length over which the light sources 211a are arranged.

The motor 120 includes a stator 121 and a rotor 122. The stator 121 may be mounted to the center portion of the fixed plate 150, and the rotor 122 may be connected to the center portion of the rotary plate 250. Accordingly, when the motor 120 operates, the rotary plate 250 connected to the fixed plate 150 via the motor 120 may stably rotate about the rotation axis thereof.

Each of the fixed plate 150 and the rotary plate 250 has a communication through-hole H1 formed in the center thereof, and each of the stator 121 and the rotor 122 of the motor 120 has a hollow shape having a cavity formed therein. A space is defined in an axial direction by the communication through-hole H1 formed in each of the fixed plate 150 and the rotary plate 250 and the cavity formed in each of the stator 121 and the rotor 122 of the motor 120.

The communication transmitter 130 and the communication receiver 230 may transmit and receive a signal therebetween through the communication through-hole H1 formed in each of the fixed plate 150 and the rotary plate 250 and the cavity formed in each of the stator 121 and the rotor 122 of the motor 120.

Accordingly, the communication transmitter 130 and the communication receiver 230 are mounted on the center of the fixed plate 150 and the center of the rotary plate 250, respectively, and thus are disposed so as to face each other, thereby transmitting and receiving a signal therebetween through the communication through-hole H1 and the cavity in the motor 120. In particular, since the communication transmitter 130 and the communication receiver 230 transmit and receive a signal therebetween only through the communication through-hole H1 and the cavity in the motor 120, introduction of an external signal is blocked, and thus control and security stability are ensured. In addition, since there is no separate wire for transmission of a command through the main controller 110, transmission of a command signal is possible even while the rotary module 200 is rotating.

Each of the power transmitter 140 and the power receiver 240 is implemented as a coil having a cavity formed in the center thereof, and the motor 120 may be disposed at the center of the cavity formed in each of the power transmitter 140 and the power receiver 240.

The power transmitter 140 and the power receiver 240 may constitute a wireless power transmission system that operates in a magnetic induction manner. In other words, the power transmitter 140 and the power receiver 240 may be implemented as coils, and when a current flows through the power transmitter 140, a magnetic field is formed around the power transmitter 140, and power is transmitted to the power receiver 240 through the magnetic field.

In particular, since each of the coils forming the power transmitter 140 and the power receiver 240 is formed in a circular shape having a cavity formed in the center thereof and the motor 120 is disposed at the center of the cavity, a mounting space of the motor 120, the power transmitter 140, and the power receiver 240 may be reduced. In other words, since spaces defined in the centers of the coils forming the power transmitter 140 and the power receiver 240 are utilized as a mounting space of the motor 120, the sizes of the fixed module 100 and the rotary module 200 may be reduced.

In addition, the fixed plate 150 may be provided with a fixed cover 160 configured to accommodate the power transmitter 140 and to be open toward the power receiver 240. Similarly, the rotary plate 250 may be provided with a rotary cover 260 configured to accommodate the power receiver 240 and to be open toward the power transmitter 140.

The fixed cover 160 and the rotary cover 260 may extend so as to face each other, and may be spaced apart from each other by a predetermined gap.

In other words, the fixed cover 160 and the rotary cover 260 are disposed so as to face each other while covering the power transmitter 140 and the power receiver 240, respectively, and are open toward each other to enable transmission and reception of power between the power transmitter 140 and the power receiver 240.

In particular, the remaining portions of the fixed cover 160 and the rotary cover 260, except for portions open toward each other, are formed to be closed, thereby preventing peripheral electronic devices from being influenced by the magnetic field generated during transmission and reception of power between the power transmitter 140 and the power receiver 240. In the present disclosure, because the motor 120 is disposed between the power transmitter 140 and the power receiver 240, the motor 120 may malfunction due to the magnetic field generated from the power transmitter 140 and the power receiver 240, and the optical module 210 may break down due to the magnetic field. Therefore, the power transmitter 140 and the power receiver 240 are covered by the fixed cover 160 and the rotary cover 260 in order to block emission of the magnetic field to the outside during transmission and reception of power between the power transmitter 140 and the power receiver 240, thereby preventing other electronic parts from being adversely affected by the magnetic field.

In addition, since the fixed cover 160 and the rotary cover 260 extend so as to face each other and are spaced a predetermined gap from each other while covering the power transmitter 140 and the power receiver 240, respectively, the rotary cover 260, which rotates together with the rotary plate 250, does not contact the fixed cover 160, whereby it is possible to prevent damage to the fixed cover 160 and the rotary cover 260 due to friction.

In addition, a position sensor S may be further included in the fixed module 100 and the rotary module 200 to detect a rotational position of the rotary module 200.

The position sensor S may include a detection transmitter 170 and a detection receiver 270. The detection transmitter 170 and the detection receiver 270 may be mounted on the fixed plate 150 and the rotary plate 250, respectively, and may be disposed so as to face each other.

The detection transmitter 170 and the detection receiver 270 may be implemented as capacitive sensors. When the rotary plate 250 is rotated by operation of the motor 120, a position at which the detection transmitter 170 and the detection receiver 270 match each other may be detected, and the rotational position of the rotary plate 250 may be determined based thereon. The rotational speed of the rotary plate 250 may be determined by detecting the rotational position of the rotary plate 250. Based on this information, timing at which each of the light sources 211a of the optical module 210 is turned on or off may be determined to form an illumination image.

The detection transmitter 170 may be provided in plural as a plurality of detection transmitters 170, and the plurality of detection transmitters 170 may be disposed on the fixed plate 150 so as to be spaced apart from each other at regular intervals. The detection receiver 270 may be provided in plural as a plurality of detection receivers 270, and the plurality of detection receivers 270 may be disposed on the rotary plate 250 so as to be spaced apart from each other at regular intervals. Therefore, it is possible to accurately detect the rotational position of the rotary plate 250. In particular, since the plurality of detection transmitters 170 is spaced apart from each other at regular intervals and the plurality of detection receivers 270 is spaced apart from each other at regular intervals, the detection transmitters 170 and the detection receivers 270 may not be biased to any sides of the respective plates, thereby minimizing rotational resistance of the rotary plate 250.

In order to mount the detection transmitters 170 and the detection receivers 270, each of the fixed plate 150 and the rotary plate 250 may have a detection through-hole H2 formed in a peripheral portion thereof. Accordingly, the detection transmitters 170 and the detection receivers 270 may be mounted on the fixed plate 150 and the rotary plate 250, respectively, so as to transmit and receive signals therebetween through the detection through-hole H2.

In addition, since the detection through-hole H2 is formed in the peripheral portion of each of the fixed plate 150 and the rotary plate 250, the detection transmitters 170 and the detection receivers 270 may be disposed so as not to interfere with the motor 120, the power transmitter 140, and the power receiver 240. Further, since the detection transmitters 170 and the detection receivers 270 are located at positions farthest from the center of the rotary plate 250 in the radial direction of the rotary plate 250, it is possible to detect the rotational position of the rotary plate 250 at sufficient time intervals, thereby improving the accuracy of detection of the rotational position of the rotary plate 250.

The rotary plate 250 and the sub-controller 212 may be formed in a circular shape. In addition, the motor 120, the power transmitter 140, and the power receiver 240 may also be designed in a circular shape.

Accordingly, when the motor 120 is driven, the rotary plate 250 may stably rotate at a high speed without being biased to one side. Further, the number of detection transmitters 170 and the number of detection receivers 270 may be identical to each other, and the detection transmitters 170 and the detection receivers 270 may be formed so as to have the same specifications, whereby stable rotation of the rotary plate 250 may be ensured.

In the image display device structured as described above, the rotary module 200 is rotated in a state of being supported by the fixed module 100, and the respective light sources 211*a* of the optical module 210 included in the rotary module 200 are turned on or off to form an illumination image.

In addition, since the rotary module 200 is physically connected to the fixed module 100 via the motor 120 and transmission and reception of a command signal and power are implemented in a wireless manner, high-speed rotation of the rotary module 200 is possible, and the durability of the device is improved.

As is apparent from the above description, according to the image display device structured as described above, electrical connection to the rotary body is reliably maintained during rotation of the rotary body, and supply of power and transmission and reception of a signal are stabilized.

In addition, since transmission and reception of a signal between the communication transmitter and the communication receiver are implemented through a cavity formed in the motor, introduction of an external signal is blocked, and thus security and control stability are ensured.

In addition, even when the rotary module rotates at a high speed, damage thereto due to friction is prevented, and thus the durability thereof is ensured. Furthermore, rotation of the rotary module is stabilized through structural stabilization.

Although the embodiments of the present disclosure have been disclosed for illustrative purposes, those having ordinary skill in the art will appreciate that various modifications, additions, and substitutions are possible, without departing from the scope and spirit of the disclosure as disclosed in the accompanying claims.

What is claimed is:

1. An image display device comprising:
a fixed module fixed to a base, the fixed module comprising a main controller, a motor, a communication transmitter, and a power transmitter; and
a rotary module rotatably connected to the motor, the rotary module comprising an optical module provided with a plurality of light sources and further comprising a communication receiver and a power receiver configured to receive a command and power from the main controller to form an illumination image by turning the plurality of light sources on or off,
wherein the fixed module further comprises a fixed plate, wherein the motor, the communication transmitter, and the power transmitter are mounted on the fixed plate,
wherein the rotary module further comprises a rotary plate connected to the fixed plate via the motor, wherein the optical module, the communication receiver, and the power receiver are mounted on the rotary plate,
wherein the motor comprises a stator and a rotor, wherein the stator is mounted to a center portion of the fixed plate, and wherein the rotor is connected to a center portion of the rotary plate,
wherein each of the fixed plate and the rotary plate comprises a communication through-hole formed in a center thereof,
wherein each of the stator and the rotor of the motor has a hollow shape having a cavity formed therein, and
wherein the communication transmitter and the communication receiver transmit and receive a signal therebetween through the communication through-hole formed in each of the fixed plate and the rotary plate and the cavity formed in each of the stator and the rotor.

2. The image display device according to claim 1, further comprising a lens cover fixed to the base to cover the fixed module and the rotary module.

3. The image display device according to claim 2, further comprising a shaft coupled to a center portion of the rotary plate,
wherein the lens cover comprises a rotation support portion formed to allow the shaft to be rotatably coupled thereto.

4. The image display device according to claim 1, wherein the optical module comprises a light source unit in which the plurality of light sources is arranged and a sub-controller configured to transmit a command and power of the main controller to the light source unit.

5. The image display device according to claim 4, wherein the light source unit comprises a plurality of light source units, wherein the plurality of light source units is disposed around the rotary plate so as to be spaced apart from each other, and
wherein the plurality of light sources is arranged in a direction perpendicular to the rotary plate.

6. The image display device according to claim 4, wherein the rotary plate and the sub-controller are formed in a circular shape.

7. The image display device according to claim 1, wherein each of the power transmitter and the power receiver is implemented as a coil having a cavity formed in a center thereof, and wherein the motor is disposed at a center of the cavity.

8. The image display device according to claim 1, wherein the fixed plate is provided with a fixed cover configured to accommodate the power transmitter and to be open toward the power receiver, and wherein the rotary plate is provided with a rotary cover configured to accommodate the power receiver and to be open toward the power transmitter.

9. The image display device according to claim 8, wherein the fixed cover and the rotary cover extend so as to face each other, and are spaced apart from each other by a predetermined gap.

10. The image display device according to claim 1, further comprising a position sensor included in the fixed module and the rotary module to detect a rotational position of the rotary module.

11. The image display device according to claim 10, wherein the position sensor comprises a detection transmitter and a detection receiver, and wherein the detection transmitter and the detection receiver are mounted on the fixed plate and the rotary plate, respectively, and are disposed so as to face each other.

12. The image display device according to claim 11, wherein the detection transmitter comprises a plurality of detection transmitters, wherein the plurality of detection transmitters is disposed on the fixed plate so as to be spaced apart from each other at regular intervals, and wherein the detection receiver comprises a plurality of detection receivers, wherein the plurality of detection receivers is disposed on the rotary plate so as to be spaced apart from each other at regular intervals.

13. The image display device according to claim 11, wherein each of the fixed plate and the rotary plate comprises a detection through-hole formed in a peripheral portion thereof, and wherein the detection transmitter and the detection receiver are mounted on the fixed plate and the rotary plate, respectively, so as to transmit and receive a signal therebetween through the detection through-hole.

* * * * *